US012597833B2

(12) United States Patent
Baek et al.

(10) Patent No.: US 12,597,833 B2
(45) Date of Patent: Apr. 7, 2026

(54) COOLING APPARATUS FOR LAMINATED MOTOR CORE MANUFACTURING PROCESS

(71) Applicant: DAEYOUNG ELECTRIC CO., LTD., Gyeongsan-si (KR)

(72) Inventors: Seung Hyun Baek, Daegu (KR); Byung Soo Kwon, Gyeongsangbuk-do (KR)

(73) Assignee: DAEYOUNG ELECTRIC CO., LTD., Gyeongsan-si (KR)

( * ) Notice: Subject to any disclaimer, the term of this patent is extended or adjusted under 35 U.S.C. 154(b) by 0 days.

(21) Appl. No.: 18/892,573

(22) Filed: Sep. 23, 2024

(65) Prior Publication Data

US 2025/0015685 A1     Jan. 9, 2025

Related U.S. Application Data

(63) Continuation of application No. PCT/KR2023/004978, filed on Apr. 13, 2023.

(30) Foreign Application Priority Data

May 2, 2022     (KR) ........................ 10-2022-0054149

(51) Int. Cl.
*H02K 15/03*     (2025.01)
*H02K 1/276*     (2022.01)

(52) U.S. Cl.
CPC ............. *H02K 15/03* (2013.01); *H02K 1/276* (2013.01)

(58) Field of Classification Search
CPC .... H01F 41/0233; H02K 1/276; H02K 15/03; H02K 15/12
See application file for complete search history.

(56) References Cited

U.S. PATENT DOCUMENTS

2025/0015685 A1* 1/2025 Baek ...................... H02K 15/12

FOREIGN PATENT DOCUMENTS

| JP | 2021-090291 A | 6/2021 | |
|----|----|----|----|
| KR | 10-1999-0053414 A | 7/1999 | |
| KR | 10-2002-0040429 A | 5/2002 | |
| KR | 10-1811266 B1 | 12/2017 | |
| KR | 10-2018-0020016 A | 2/2018 | |
| KR | 10-2019-0135281 A | 12/2019 | |
| KR | 10-2021-0154779 A | 12/2021 | |
| KR | 20230145719 A * | 10/2023 | ............. H02K 15/03 |
| KR | 20240025840 A * | 2/2024 | ............. H02K 15/03 |

OTHER PUBLICATIONS

International Search Report for PCT/KR2023/004978 mailed Aug. 2, 2023 from Korean Intellectual Property Office.

* cited by examiner

*Primary Examiner* — Minh N Trinh
(74) *Attorney, Agent, or Firm* — Revolution IP, PLLC

(57)     ABSTRACT

A cooling apparatus for manufacturing a laminated core of a motor includes a transfer jig 30 which includes an upper jig 31, and a lower jig 32 in which a laminated core 200 is mounted; a base plate 40 in which the transfer jig 30 is installed and moved; an inner cool air supply port 75 which is installed in the lower part of the base plate; and a proximate cooler 8 which is installed to cover the exterior of the transfer jig 30 and comprises a cover 81 and a side wall 82 extending downwardly from the circumference of the cover 81, characterized in that an outer groove 83 is formed vertically on the outer side of the side wall 82 of the proximate cooler 8, and an inner groove 85 is formed vertically on the inner side of the side wall 82.

6 Claims, 8 Drawing Sheets

(A)

(B)

COOLING APPARATUS FOR LAMINATED MOTOR CORE MANUFACTURING PROCESS

BACKGROUND OF THE INVENTION

The present invention relates to a cooling apparatus used in a process for manufacturing a laminated core of a motor. More specifically, the present invention relates to a cooling apparatus for a process of manufacturing a laminated core of a motor capable of improving the productivity of a laminated core such as a rotor core and a stator core and the quality of products.

In general, a stator or a rotor of a motor comprises a laminated core. The laminated core is manufactured by laminating a plurality of lamina members continuously formed from an electrical steel sheet by a press machine. A laminated lamina member needs to be combined with lamina members laminated therebelow and thereabove, and the way of combining them is disclosed in Korean Patent No. 10-1811266.

Korean Patent No. 10-1811266 discloses a manner of forming a core sheet in a press die using a self-bonding steel strap on which an adhesive layer is coated on the steel strap, and heating a laminated core while laminating the core sheet, thereby adhering the core sheets with each other. The adhesive layer between core sheets is thermally cured by the heating in the press die, to obtain a laminated core in which core sheets are adhered to each other, and the manufactured laminated core is cooled through a cooling process and then products are shipped.

Korean Patent Laid-Open No. 10-2021-0154779 discloses a technique of laminating a laminated core in a press die, combining an upper jig and a lower jig while placing the laminated core in the lower jig, and transferring these jigs through a conveyor to perform high-frequency induction heating and cooling.

Here, by means of high-frequency induction heating, a laminated core is heated to thermally cure the adhesive layer between core sheets, thereby manufacturing a laminated core product. In addition to the laminated core, the upper and lower jigs in which the laminated core is placed are heated by high-frequency induction heating. Accordingly, a process for cooling the laminated core together with the upper and lower jigs is necessary.

To this end, the cooling part uses cool air to cool the entire cooling chamber in which the laminated core, and the upper and lower jigs are located. However, cool air is supplied only to the outside of the laminated core, and thus the inside of the laminated core is not completely cooled. Additionally, the inside of the upper and lower jigs in which the laminated core is placed needs to be cooled as well. Therefore, if subsequent processes stand by for natural cooling, the manufacturing process may be delayed, and the productivity may be reduced.

Accordingly, the inventors of the present invention suggest a cooling apparatus for a process of manufacturing a laminated core of a motor capable of improving the productivity and quality of a laminated core by rapidly cooling the inside of the laminated core that is placed between upper and lower jigs and heated.

SUMMARY OF THE INVENTION

It is an object of the present invention to provide a cooling apparatus for a process of manufacturing a laminated core of a motor configured to spray cool air simultaneously onto the exterior and interior of a laminated core that is placed between upper and lower jigs and transferred, thereby rapidly cooling the whole of the laminated core and the upper and lower jigs.

The objects above and other objects inferred therein can be easily achieved by the present invention explained below.

A cooling apparatus for a process of manufacturing a laminated core of a motor according to the present invention comprises a transfer jig 30 which comprises an upper jig 31, and a lower jig 32 in which a laminated core 200 is mounted; a base plate 40 in which the transfer jig 30 is installed and moved; an inner cool air supply port 75 which is installed in the lower part of the base plate 40 to supply cool air to the lower part of the base plate 40; and a proximate cooler 8 which is installed to cover the exterior of the transfer jig 30 and comprises a cover 81 and a side wall 82 extending downwardly from the circumference of the cover 81, characterized in that an outer groove 83 is formed vertically on the outer side of the side wall 82 of the proximate cooler 8, and an inner groove 85 is formed vertically on the inner side of the side wall 82.

In the present invention, a tube expansion plate 321 inserted into the inner space of the laminated core 200 may be installed in the lower jig 32.

In the present invention, the tube expansion plate 321 may have a plurality of tube expansion plate through holes 321A formed vertically therethrough to be in communication with a central hole 41 in the center of the base plate 40.

In the present invention, it is preferable that the upper jig 31 has a first upper jig hole 31A which is in vertical communication with a first laminated core hole 220 of the laminated core 200, the lower jig 32 has a first lower jig hole 32A which is in vertical communication with the first laminated core hole 220, and the base plate 40 has a first base plate hole 40A which is in vertical communication with the first lower jig hole 32A.

In the present invention, the cool air supplied from the lower part of the base plate 40 may pass through the transfer jig 30 and move upwardly to be discharged to the outside through a cool air discharge port 81A.

In the present invention, the cool air injected from a cool air injection port 81B of the cover 81 may be sprayed onto the exterior of the transfer jig 30 through a cool air spraying hole 86 formed in the inner direction of the side wall 82.

In the present invention, the proximate cooler 8 may vertically move by a lifting and lowering drive means 78.

A cooling apparatus for a process of manufacturing a laminated core of a motor according to the present invention comprises a transfer jig 30 which comprises an upper jig 31, and a lower jig 32 in which a laminated core 200 is mounted; a base plate 40 in which the transfer jig 30 is installed and moved; and a tube expansion plate 321 which is formed in the lower jig 32 and inserted into the inner space of the laminated core 200, characterized in that the tube expansion plate 321 has a plurality of tube expansion plate through holes 321A formed vertically therethrough to be in communication with a central hole 41 in the center of the base plate 40.

The present invention may further comprise an inner cool air supply port 75 which is installed in the lower part of the base plate 40 to supply cool air to the lower part of the base plate 40.

In the present invention, the upper part of the inner cool air supply port 75 may have the shape of covering the central hole 41 and the first base plate hole 40A, and the cool air supplied from a cool air supply means 71A may flow into the lower part of the inner cool air supply port 75.

The present invention provides a cooling apparatus for a process of manufacturing a laminated core of a motor with a novel structure which sprays cool air simultaneously onto the exterior and interior of a laminated core, to cool the heated laminated core and a transfer jig, thereby capable of improving productivity and also manufacturing laminated cores with excellent and uniform quality.

Additionally, the present invention performs a rapid and uniform cooling process which prevents thermal deformation of a laminated core and reduces dimensional errors of the upper and lower jigs in which the laminated core is mounted and transferred, thereby reducing the defect rate of laminated core products.

Hereinafter, the present invention will be explained in detail with reference to the accompanying drawings.

DETAILED DESCRIPTION OF THE INVENTION

Figure 1:
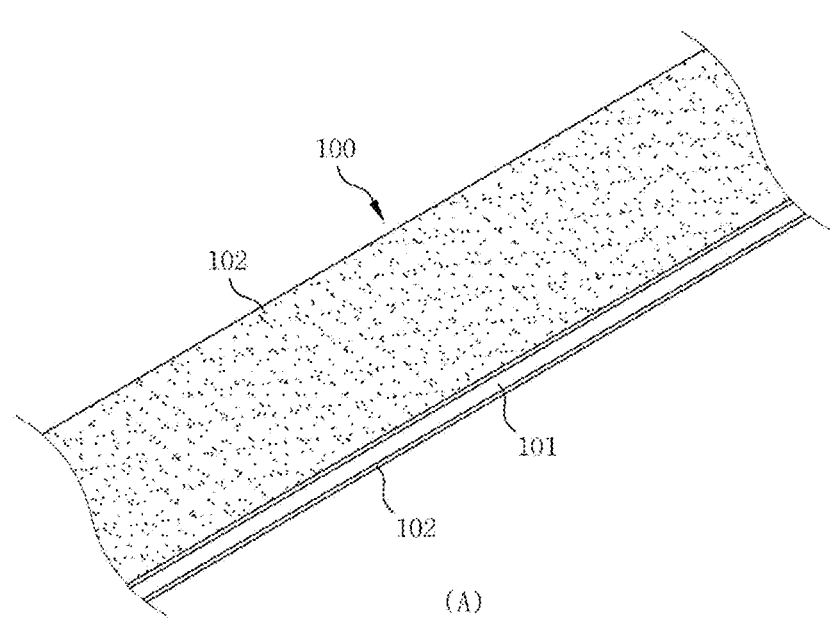
FIG. 1 is a view illustrating a base material used in an apparatus for manufacturing a laminated core of a motor for explaining a cooling apparatus for a process of manufacturing a laminated core of a motor according to the present invention.
Figure 1:
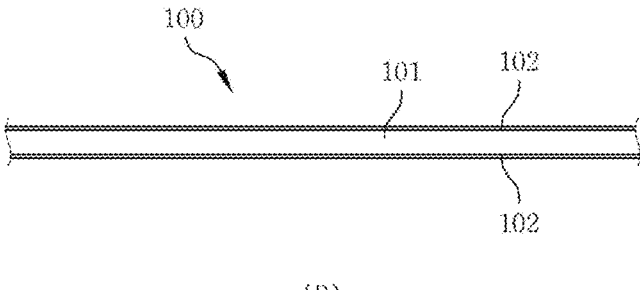
Figure 2:
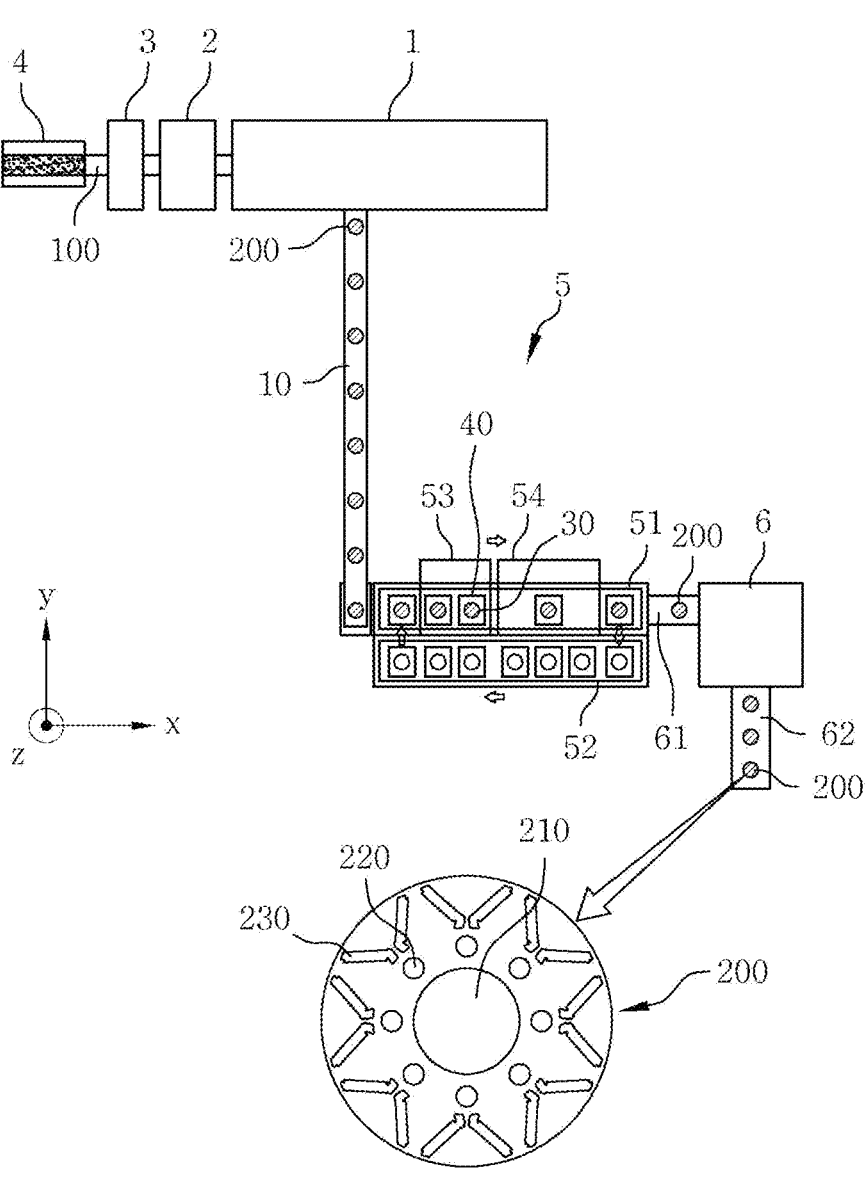
FIG. 2 is a plan view illustrating the entire layout of the apparatus for manufacturing a laminated core of a motor for explaining the cooling apparatus for a process of manufacturing a laminated core of a motor according to the present invention.

FIG. 1 is a view illustrating a base material 100 used in an apparatus for manufacturing a laminated core of a motor for explaining a cooling apparatus 7 for a process of manufacturing a laminated core of a motor according to the present invention, and FIG. 2 is a plan view illustrating the entire layout of the apparatus for manufacturing a laminated core of a motor for explaining the cooling apparatus 7 for a process of manufacturing a laminated core of a motor according to the present invention.

As illustrated in FIG. 1, the base material 100 used in the present invention, in which an adhesive coating layer 102 is formed on the front surface and back surface of an electrical steel sheet 101, is a so-called self-bonding steel sheet. FIG. 1(A) is a perspective view illustrating a part of the base material 100, and FIG. 1(B) is a side view thereof.

As illustrated in FIG. 2, the base material 100 of the present invention is continuously supplied to the apparatus for manufacturing a laminated core, and is sequentially formed into a lamina member in the form of a sheet in a laminating unit 1, which is a progressive press machine. A plurality of formed lamina members are stacked to make a laminated core 200. The laminated core 200 in FIG. 2 represents a rotor core; however, in the present invention, the laminated core 200 is not limited to a rotor core, but may be a stator core.

The laminated core 200 may include an inner space 210 formed in the central portion, and a first laminated core hole 220 and a second laminated core hole 230 formed around the inner space 210. When the laminated core 200 is a rotor core, a rotational shaft may be coupled to the inner space 210, and the first laminated core hole 220 or the second laminated core hole 230 may be a magnet insertion hole or a hole used for other purposes. When the laminated core 200 is a stator core, a rotor may be located in the inner space 210, and the first laminated core hole 220 or the second laminated core hole 230 may be a slot or a hole used for other purposes. The shapes of these various holes may be changed according to the type of laminated core.

The apparatus for manufacturing a laminated core of a motor to which the present invention applies comprises a laminating unit 1 for forming a base material 100 into lamina members to manufacture a laminated core, a pre-treatment unit 2 for coating an activator, etc. on the base material 100, a welding unit 3 for continuously connecting the base materials supplied, an uncoil unit 4 for supplying the base material from a reel around which the base material is wound, a post-processing unit 5 for performing a process after the lamination, and a detection unit 6 for conducting a final defection of a product.

The laminating unit 1 forms the base material 100 which has passed through the pre-treatment unit 2 into lamina members by continuous press processing, and laminates a plurality of lamina members to manufacture a laminated core 200. The pre-treatment unit 2 is installed in the back of the laminating unit 1 to perform operations such as coating an activator on the surface of the base material 100, measuring the thickness, etc. As used herein, for reference, the terms "front" and "back" mean +x and −x directions, respectively, the terms "upper" and "lower" mean +z and −z directions, respectively, and the terms "left" and "right" mean +y and −y directions, respectively. Additionally, the term "one side" means any one direction in the xy plane.

The laminated core 200 manufactured by laminating lamina members 201 formed from the base material 100 in the laminating unit 1 is placed on a discharge conveyor 10 installed at one side of the laminating unit 1. The laminated core 200 is transferred through the discharge conveyor 10 to one side of the post-processing unit 5 installed at one side of the discharge conveyor 10. The discharge conveyor 10 may be a conveyor of a roller type or may be a belt conveyor. The transferred laminated core 200 is transferred and mounted on a transfer jig 30 of the post-processing unit 5.

The post-processing unit 5 performs collateral processing on the laminated core 200 in order to increase the product reliability of the laminated core 200 manufactured in the laminating unit 1, and comprises a process line 51, a return line 52, an induction heating unit 53, and a cooling unit 54. The transfer jig 30 in which the laminated core 200 is mounted moves along the process line 51, subjecting to heating and cooling processes. Afterwards, the empty transfer jig 30 which has transferred the laminated core 200 to the detection unit 6 moves along the return line 52 to its original location. In the process line 51 and the return line 52, the transfer jig 30 is transferred along the line in which the conveyor is installed.

The cooling unit 54 is installed at one side of the induction heating unit 53 to cool the heated laminated core 200. A loading unit 61 transfers the laminated core 200 which has finished the post-processing in the process line 51 to the detection unit 6. In the detection unit 6, laminated cores 200 are detected, and good products are distinguished from defective products and shipped in a shipping unit 62.

Figure 3:
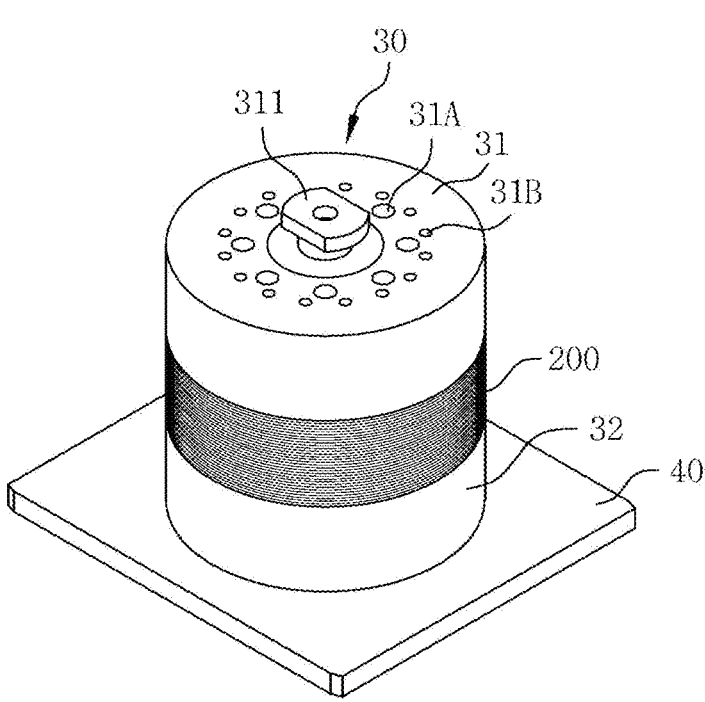
FIG. 3 is a perspective view illustrating a transfer jig in which a laminated core is mounted for explaining the cooling apparatus for a process of manufacturing a laminated core of a motor according to the present invention.
Figure 4:
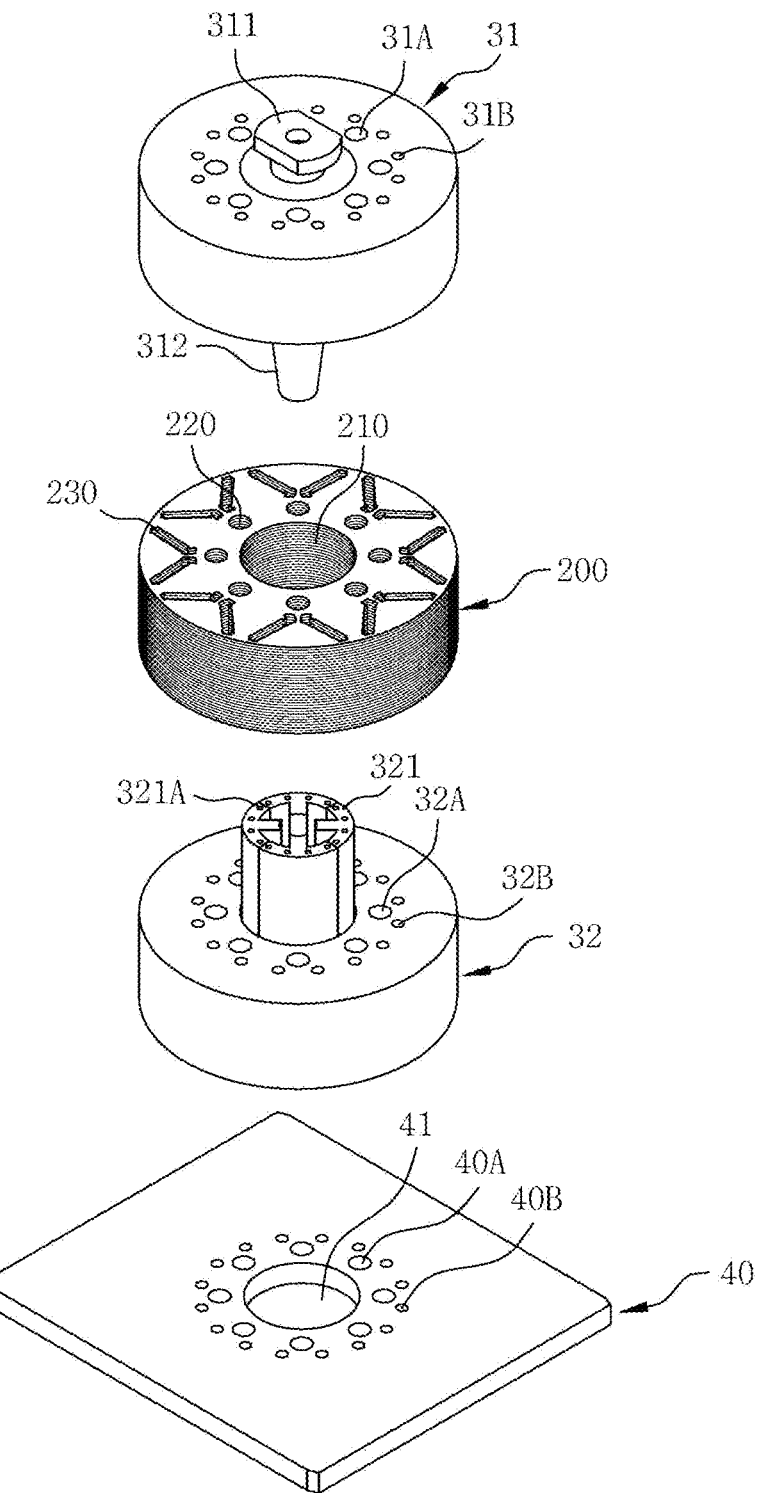
FIG. 4 is an exploded perspective view illustrating the transfer jig in which a laminated core is mounted for explaining the cooling apparatus for a process of manufacturing a laminated core of a motor according to the present invention.

FIG. 3 is a perspective view illustrating a transfer jig 30 in which a laminated core 200 is mounted for explaining the cooling apparatus 7 for a process of manufacturing a laminated core of a motor according to the present invention, and FIG. 4 is an exploded perspective view illustrating the transfer jig 30.

Referring to FIGS. 3 and 4 together, the transfer jig 30 of the present invention comprises an upper jig 31 and a lower jig 32. The upper jig 31 has a structure of being coupled to the lower jig 32 while a laminated core 200 is mounted in the lower jig 32. The lower jig 32 is coupled to the upper part of a base plate 40.

The upper jig 31 has a cylindrical shape like the laminated core 200, and the upper jig 31 includes a handle 311 protruding upwardly from the center and a tube expansion rod 312 protruding downwardly. The lower jig 32 has a tube expansion plate 321 protruding upwardly from the center for coupling.

The tube expansion plate 321 has a cylindrical shape divided in the vertical direction, and the tube expansion plate 321 is inserted into the inner space 210 of the laminated core 200. When the upper jig 31 is coupled to the upper part of the laminated core 200 while the tube expansion plate 321 is located in the inner space 210, the tube expansion rod 312 of the upper jig 31 is inserted into the inside of the tube expansion plate 321. In this case, the tube expansion plate 321 is pushed outwardly such that the outer surface of the tube expansion plate 321 closely contacts the inner surface of the inner space 210 of the laminated core 200. Accordingly, the laminated core 200 can be steadily mounted in the regular position, and can be stably mound in the transfer jig 30 and transferred.

The transfer jig 30 according to the present invention is installed in the upper part of the base plate 40, and the base plate 40 moves to the front or to the back by a roller conveyor 51A installed in the process line 51. The transfer jig 30 moves to the front in the process line 51 and passes through the induction heating unit 53 and the cooling unit 54. The laminated core 200 and transfer jig 30 are heated to a high temperature in the induction heating unit 53, and the heated laminated core 200 and transfer jig 30 are rapidly cooled in the cooling unit 54.

In the cooling apparatus 7 according to the present invention, cool air is injected from the lower part of the base plate 40, in order to rapidly cool the heated laminated core 200 and transfer jig 30. A central hole 41 is formed in the center of the base plate 40, and a plurality of first base plate holes 40A and a plurality of second base plate holes 40B are formed around the central hole 41. A plurality of the central holes 41 may be provided according to necessity.

The cool air injected into the central hole 41 flows in from the lower part of the tube expansion plate 321 to the upper part, to cool the tube expansion plate 321. In order to cool the tube expansion plate 321 more rapidly and evenly, a plurality of tube expansion plate through holes 321A formed vertically through the tube expansion plate 321 may be provided.

The first base plate hole 40A is a hole to which cool air is supplied to cool the interior of the lower jig 32, the laminated core 200, and the upper jig 31. The lower jig 32 has a first lower jig hole 32A at a position corresponding to the first base plate hole 40A to be in vertical communication therewith. The first lower jig hole 32A is in vertical communication with the first laminated core hole 220 of the laminated core 200. The upper jig 31 has a first upper jig hole 31A which is in vertical communication with the first laminated core hole 220. Therefore, the first base plate hole 40A, the first lower jig hole 32A, the first laminated core hole 220, and the first upper jig hole 31A are formed to be in vertical communication with each other. Accordingly, cool air, flowing in from the lower part through the first base plate hole 41A, passes through the first lower jig hole 32A, the first laminated core hole 220, and the first upper jig hole 31A while moving upwardly, and is heat-exchanged to hot air and then discharged to the upper part.

Similarly, the second base plate hole 40B is a hole to which cool air is supplied to separately cool the interior of the lower jig 32, the laminated core 200, and the upper jig 31. These holes may not be formed according to the shape of the laminated core 200. The lower jig 32 has a second lower jig hole 32B at a position corresponding to the second base plate hole 40B to be in vertical communication therewith. The second lower jig hole 32B is in vertical communication with the second laminated core hole 230 of the laminated core 200. The upper jig 31 has a second upper jig hole 31B which is in vertical communication with the second laminated core hole 230. Therefore, the second base plate hole 40B, the second lower jig hole 32B, the second laminated core hole 230, and the second upper jig hole 31B are formed to be in vertical communication with each other. Accordingly, cool air, flowing in from the lower part through the second base plate hole 41B, passes through the second lower jig hole 32B, the second laminated core hole 230, and the second upper jig hole 31B while moving upwardly, and is heat-exchanged to hot air and then discharged to the upper part.

Figure 5:
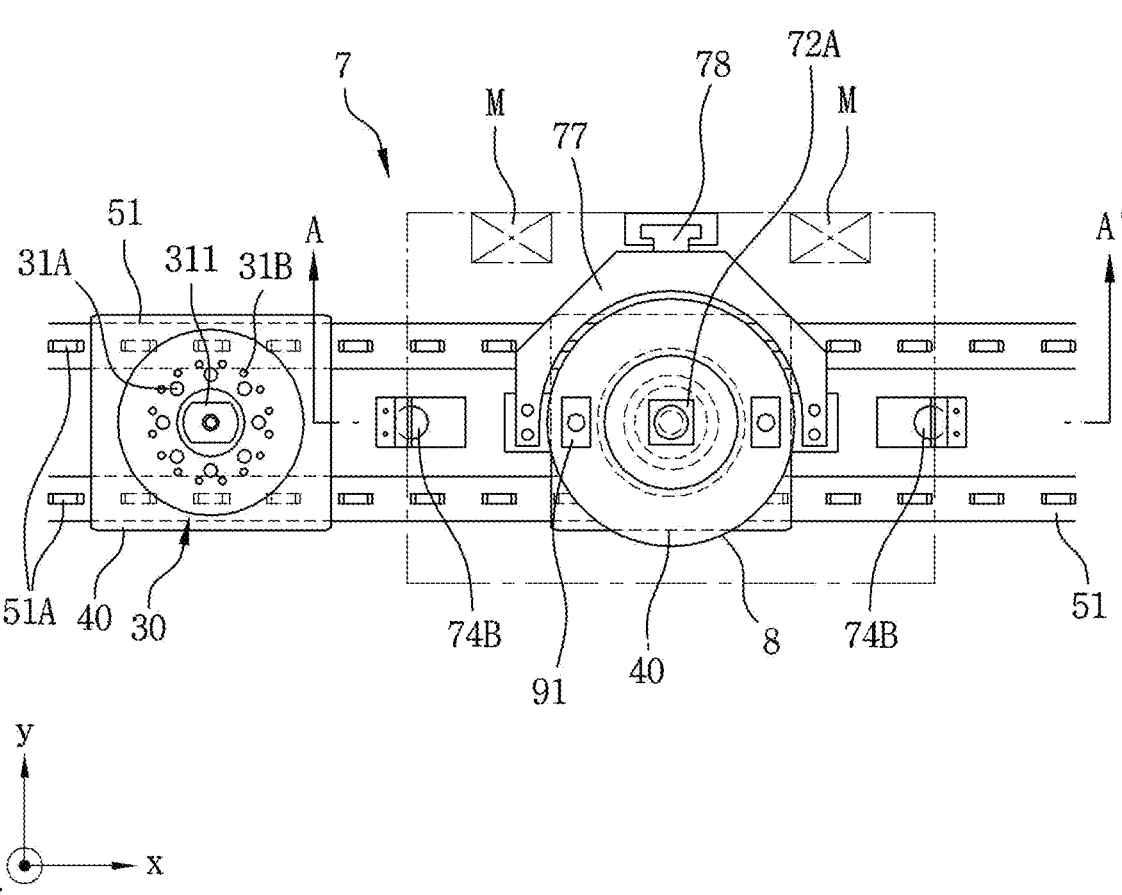
FIG. 5 is a plan view illustrating the cooling apparatus for a process of manufacturing a laminated core of a motor according to the present invention.
Figure 6:
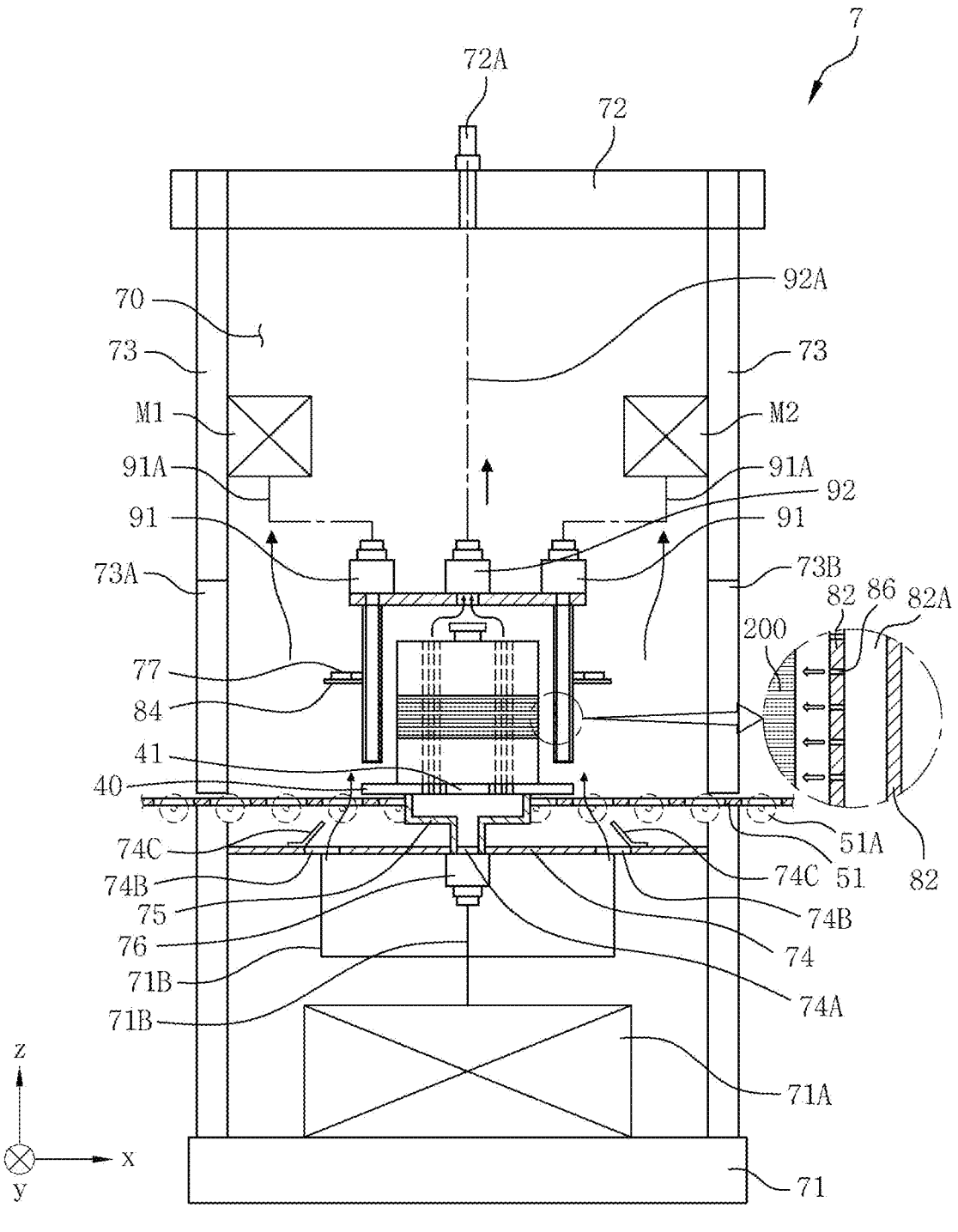
FIG. 6 is a lateral cross-sectional view taken along line A-A' of FIG. 5 for illustrating the cooling apparatus for a process of manufacturing a laminated core of a motor according to the present invention.

FIG. 5 is a plan view illustrating the cooling apparatus 7 for a process of manufacturing a laminated core of a motor according to the present invention, and FIG. 6 is a lateral cross-sectional view taken along line A-A' of FIG. 5 for illustrating the cooling apparatus 7 for a process of manufacturing a laminated core of a motor according to the present invention.

As illustrated in FIGS. 5 and 6, the cooling apparatus 7 for a process of manufacturing a laminated core of a motor according to the present invention is installed in the cooling unit 54, and is for rapidly and efficiently cooling the laminated core 200 and the transfer jig 30 in which the laminated core 200 is mounted. The cooling apparatus 7 may be installed in the process line 51 as illustrated in FIG. 5, or may be installed at one side of the process line 51 according to necessity.

The cooling apparatus 7 according to the present invention comprises a lower frame 71, a side frame 73 installed in the circumference of the lower frame 71, and an upper frame 72 installed in the upper part of the side frame 73. A cool air supply means 71A such as an air conditioner or a compressor is installed in the lower frame. A middle frame 74 is installed in the upper side of the cool air supply means 71A to form a cooling chamber 70 which is a space in the upper side of the middle frame 74.

The cool air is supplied to the cooling chamber 70 through first and second lower cool air supply holes 74A, 74B formed in the middle frame 74 through a cool air supply hose 71B connected to the cool air supply means 71A. The cool air (strictly hot air, no longer cool air) having an increased temperature by heat exchange from the transfer jig 30 and laminated core 200 in the cooling chamber 70 is discharged to the outside of the apparatus through an air discharge port 72A installed in the upper frame 72.

The transfer jig 30 which moves together with the base plate 40 moves into the cooling chamber 70 through a front door 73A of the cooling apparatus 7, and may move out of the cooling chamber 70 through a back door 73B after the cooling. The front door 73A and back door 73B operate vertically so as for the transfer jig 30 to move into and out of the cooling chamber and to cut off the inside and outside of the cooling chamber 70. In some cases, when the cooling apparatus 7 is located at one side of the process line 51, the transfer jig 30 may move into and out of the cooling chamber 70 through the front door 73A without the back door 73B.

The transfer jig 30 which moves into the cooling chamber 70 by the operation of the roller conveyor 51A is located in the upper part of an inner cool air supply port 75 installed in the center of the middle frame 74. In other words, when the base plate 40 is located in the upper part of the inner cool air supply port 75, the cool air supplied through the inner cool air supply port 75 flows into the transfer jig 30.

The inner cool air supply port 75 has the upper part and lower part open, and the upper part of the inner cool air supply port 75 has the shape of covering the central hole 41, the first base plate hole 40A and the second base plate hole 40B of the base plate 40. The lower part of the inner cool air supply port 75 is in communication with a first lower cool air supply hole 74A formed in the center of the middle frame 74. A lower air amplifier 76 is installed in the lower part of the first lower cool air supply hole 74A so that the cool air supplied from the cool air supply means 71A can strongly flow in from the lower part of the transfer jig 30. The cool air supplied from the cool air supply means 71A is supplied to the lower air amplifier 76 through the cool air supply hose 71B, to be supplied to the lower part of the transfer jig 30.

Additionally, the cool air supplied from the cool air supply means 71A flows into the inside of the cooling chamber 70 by passing the second lower cool air supply hole 74B through the cool air supply hose 71B. In this case, a cool air guide plate 74C is installed around the upper part of the second lower cool air supply hole 74B to guide the direction of the cool air flowing into the cooling chamber 70.

When the transfer jig 30 is located in the upper side of the inner cool air supply port 75, a proximate cooler 8 is located outside the transfer jig 30, and the outer portion of the transfer jig 30 is cooled by the proximate cooler 8. The proximate cooler 8 is installed to move vertically. To this end, a lifting and lowering drive means 78 for vertically moving a lifting and lowering bracket 77 coupled to the proximate cooler 8 may be installed in the side frame 73 or the middle frame 74. The constitution of the proximate cooler 8 will be explained below with reference to FIGS. 7 and 8 together.

Figure 7:
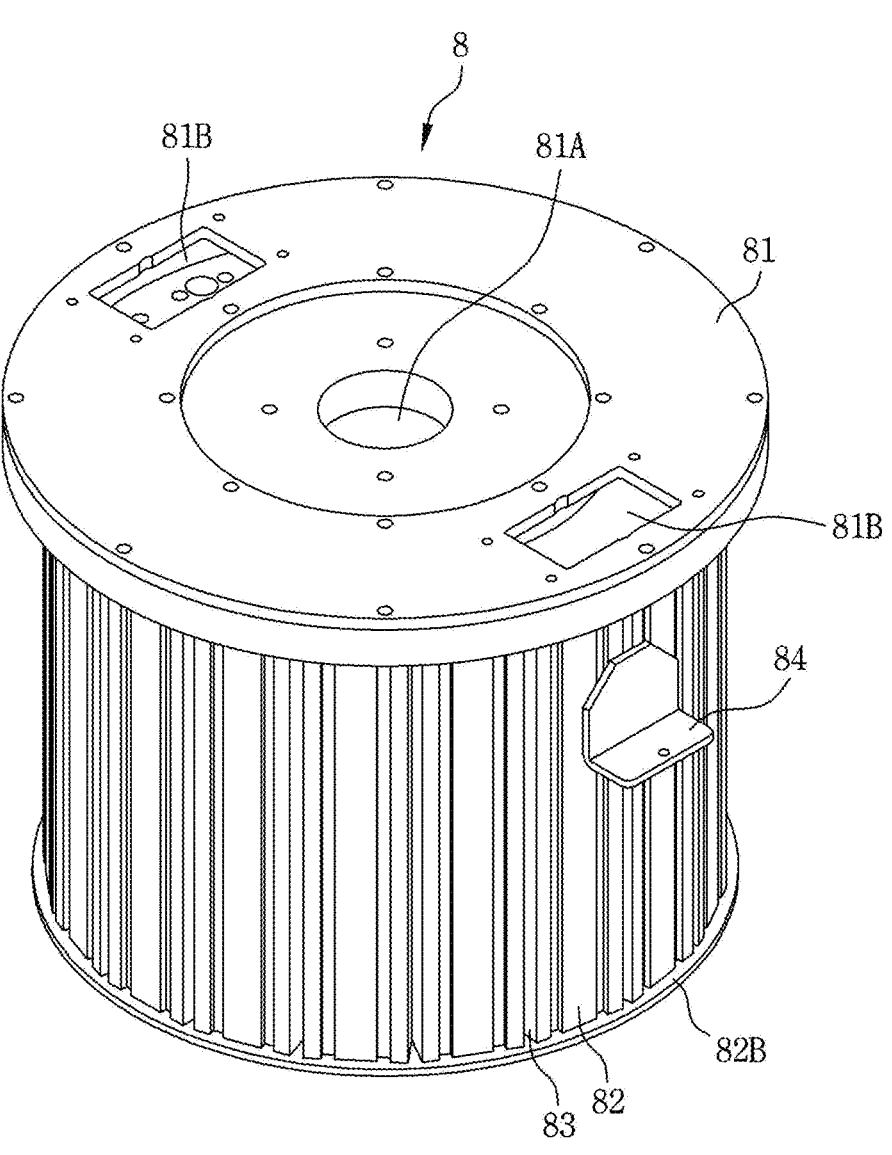
FIG. 7 is a top perspective view illustrating a proximate cooler of the cooling apparatus for a process of manufacturing a laminated core of a motor according to the present invention.
Figure 8:
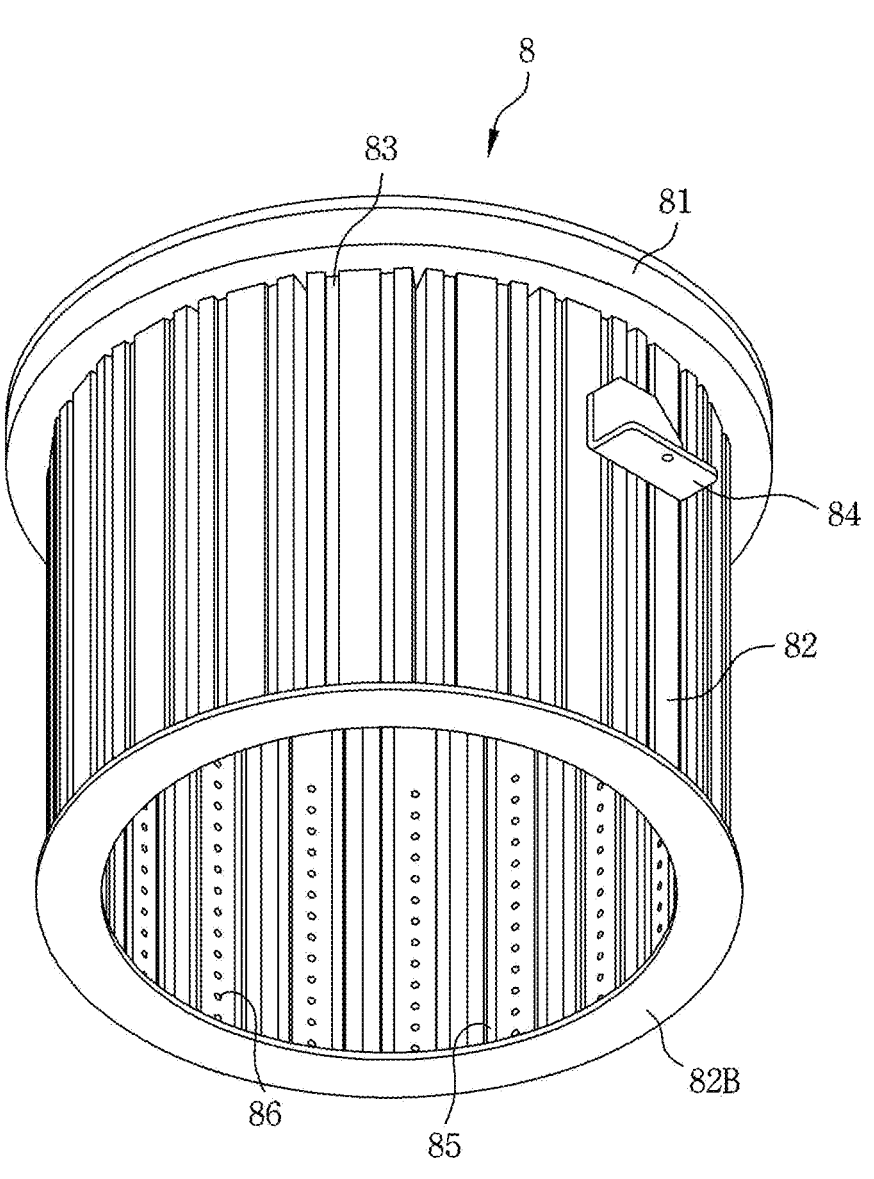
FIG. 8 is a bottom perspective view illustrating the proximate cooler of the cooling apparatus for a process of manufacturing a laminated core of a motor according to the present invention.

FIG. 7 is a top perspective view illustrating a proximate cooler 8 of the cooling apparatus 7 for a process of manufacturing a laminated core of a motor according to the present invention, and FIG. 8 is a bottom perspective view thereof. The proximate cooler 8 of the present invention cools the exterior of the transfer jig 30 and also discharges the rising air by heat exchange from the inside of the transfer jig 30 to the outside.

The proximate cooler 8 comprises a cover 81, a side wall 82 extending downwardly from the circumference of the cover 81, an outer groove 83 formed vertically on the outer side of the side wall 82, a flange 84 protruding outwardly from the side wall 82, and an inner groove 85 formed vertically on the inner side of the side wall 82. The cooling rate and efficiency may be increased by the shapes of the outer groove 83 and inner groove 85.

A cool air discharge port 81A is formed vertically through the center of the cover 81. The cool air discharge port 81A is a port through which the hot air heat-exchanged by passing through the inside of the transfer jig 30 is discharged. An air inhaler 92 is installed in the upper part of the cool air discharge port 81A, and the hot air inhaled by the air inhaler 92 is discharged from an air discharge port 72A through an air discharge hose 92A.

A plurality of cool air injection ports 81B are formed in the outer circumference of the cover 81 and the upper part of the side wall 82. The cool air injection port 81B is configured to circulate air with a cool air injection passage 82A formed inside the side wall 82 and a plurality of cool air spraying holes 86. An upper air amplifier 91 is installed in the upper part of the cool air injection port 81B. The upper air amplifier 91 forcibly injects into the cool air injection port 81B the cool air of the cooling chamber 70 supplied by a blower motor M. The injected cool air is sprayed onto the outer surface of the transfer jig 30 through the cool air spraying holes. The cool air sprayed through this process and the transfer jig 30 are heat-exchanged, and the hot air generated by the heat-exchange is discharged to the outside via the cool air discharge port 81A by the operation of the air inhaler 92.

The detailed description of the present invention described as above simply explains examples for understanding the present invention, but does not intend to limit the scope of the present invention. The scope of the present invention is defined by the accompanying claims. Additionally, it should be construed that simple modifications or changes of the present invention fall within the scope of the present invention.

The invention claimed is:

1. A cooling apparatus for a process of manufacturing a laminated core of a motor, the cooling apparatus comprising:
   a transfer jig (30) comprising an upper jig (31) and a lower jig (32), wherein the transfer jig (30) is configured to mount the laminated core (200);
   a base plate (40) coupled to the transfer jig (30) and configured to transfer the laminated core (200);
   an inner cool air supply port (75) coupled to a lower part of the base plate (40) to supply a cool air to the lower part of the base plate (40); and
   a proximate cooler (8) installed to cover an exterior of the transfer jig (30), and the proximate cooler (8) comprising a cover (81) and a side wall (82) that extending downward from a circumference of the cover (81),
   wherein an outer groove (83) is vertically formed on an outer side of the side wall (82) of the proximate cooler (8), and an inner groove (85) is vertically formed on the inner side of the side wall (82),
   wherein a cool air injection port (81B) of the cover (81) is configured to inject the cool air to the exterior of the transfer jig (30) by a cool air spraying hole (86) formed in an inner direction of the side wall (82), and a cool air discharge port (81A) is the mounted at a center of the cover (81) to discharge the cool air passing through an inside of the transfer jig (30).

2. The cooling apparatus of claim 1, further comprising a tube expansion plate (321) installed in the lower jig (32) and inserted into an inner space of the laminated core (200).

3. The cooling apparatus of claim 2, wherein the tube expansion plate (321) has a plurality of tube expansion plate through holes (321A) vertically formed therethrough and is configured to communicate with a central hole (41) in a center of the base plate (40).

4. The cooling apparatus of claim 1, wherein the upper jig (31) has a first upper jig hole (31A) being configured to communicate vertical with a first laminated core hole (220) of the laminated core (200), the lower jig (32) has a first lower jig hole (32A) being configured to communicate vertical with the first laminated core hole (220), and the base plate (40) has a first base plate hole (40A) being configured to communicate vertical with the first lower jig hole (32A).

5. The cooling apparatus of claim 4, wherein the cool air supplied from the lower part of the base plate (40) is configured to go pass through the transfer jig (30) and moves upward to be discharged to the outside through the cool air discharge port (81A).

6. The cooling apparatus of claim 1, wherein the proximate cooler (8) is configured to move vertically upward by a lifting and lowering drive means (78).

\* \* \* \* \*